United States Patent Office 2,752,367
Patented June 26, 1956

2,752,367
STEROID COMPOUNDS

Raymond L. Pederson, Kalamazoo Township, Kalamazoo County, and Arnold C. Ott, Kalamazoo, Mich., assignors to The Upjohn Company, Kalamazoo, Mich., a corporation of Michigan No Drawing. Application October 8, 1952,
Serial No. 313,811

4 Claims. (Cl. 260—397.2)

The present invention relates to the synthesis of steroid compounds and is more particularly concerned with a novel and industrially important synthesis of $\Delta^{4,22}$-3-ketosteroids. Of particular interest is the synthesis of 24-lower-alkyl-4,22-cholestadien-3-ones which may be represented by the formula

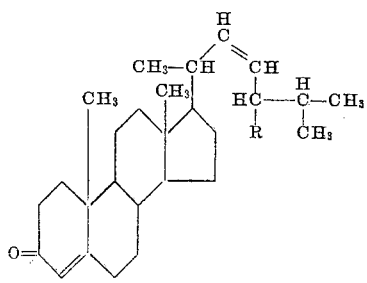

wherein R is a lower-alkyl group, such as, for example, is present in 4,22-stigmastadien-3-one where R is —$C_2H_5$, in 4,22-brassicastadien-3-one where R is —$CH_3$, in 4,22-chalinastadien-3-one where R is —$CH_3$, and in 4,22-poriferastadien-3-one where R is —$C_2H_5$, and other like examples.

It is an object of the present invention to provide a novel synthesis of $\Delta^{4,22}$-3-ketosteroids. An additional object is to provide a novel and economically important synthesis of 24-lower-alkyl-4,22-cholestadien-3-ones of the above structural formula. A further object is to provide a novel synthesis which provides high yields of substantially pure 4,22-stigmastadien-3-one, a compound which may be converted to the physiologically active steroid hormone, progesterone [U. S. Patent 2,601,287]. Other $\Delta^{4,22}$-3-ketosteroids produced by the process of this invention such as, for example, 4,22-brassicastadien-3-one, may be converted to progesterone by this same prior art procedure. Other objects and uses of this invention will be apparent to one skilled in the art.

According to the method of the present invention, a 3-acyloxy-5,6,22,23-tetrabromosteroid is hydrolyzed with a hydrolyzing agent to obtain a 3-hydroxy-5,6,22,23-tetrabromosteroid, the resulting hydroxysteroid is oxidized with an oxidizing agent to obtain a 3-keto-5,6,22,23-tetrabromosteroid, and the resulting tetrabromoketone is dehalogenated using a dehalogenating agent to obtain a $\Delta^{4,22}$-3-ketosteroid.

The prior art shows conversion of a 3-acyloxy-5,6,22,23-tetrabromosteroid, 3-acetoxy-5,6,22,23-tetrabromostigmastane, to a $\Delta^{4,22}$-3-ketosteroid, 4,22-stigmastadien-3-one, by a four-step process which included treatment of 3-acetoxy-5,6,22,23-tetrabromostigmastane with sodium iodide to obtain 3-acetoxy-22,23-dibromo-5-stigmastene, heating the dibromosteroid with alkali to obtain 22,23-dibromo-5-stigmasten-3-ol, heating the 3-hydroxysteroid overnight with aluminum tertiary-butoxide and acetone to obtain 22,23-dibromo-5-stigmasten-3-one, and heating the 3-ketosteroid with zinc and acetic acid to obtain 4,22-stigmastadien-3-one. Each of the intermediate compounds was isolated and purified prior to its use in the next step and the overall yield was poor [Fernholz and Stavely, J. Am. Chem. Soc., 61, 2956 (1939)]. In contrast, the method of the present invention involves only three steps for the conversion of a 3-acyloxy-5,6,22,23-tetrabromosteroid to a $\Delta^{4,22}$-3-ketosteroid, e. g., 3-acetoxy-5,6,22,23-tetrabromostigmastane gives a high yield of substantially pure 4,22-stigmastadien-3-one, according to a convenient process in which none of the intermediate compounds need be purified, the overall yield is high, no application of heat is required in any of the three steps, and more economical reagents may be used, e. g., the inexpensive chromium trioxide may be used in the present process because of the absence of double bonds, instead of the more costly combination of an aluminum alkoxide and a hydrogen acceptor compound of the prior art process, for oxidizing a three-hydroxy group to a three-keto group. The prior art shows other methods for the preparation of $\Delta^{4,22}$-3-ketosteroids such as the conversion of $\Delta^{5,22}$-3-hydroxysteroids to $\Delta^{4,22}$-3-ketosteroids, e. g., the preparation of 4,22-stigmastadien-3-one from stigmasterol, however these processes are costly and either give inferior product or provide poor yields of purified product. None of the prior art processes is as economically feasible as the method of the present invention which provides high yields of pure product. Other advantages of the process of this invention will be apparent to one skilled in the art.

In carrying out the method of the present invention to produce 24-lower-alkyl-4,22-cholestadien-3-ones, a 3-acyloxy-5,6,22,23-tetrabromo-24-lower-alkyl-cholestane is hydrolyzed with a hydrolyzing agent to obtain a 5,6,22,23-tetrabromo-24-lower-alkyl-cholestan-3-ol, the resulting hydroxysteroid is oxidized with an oxidizing agent to obtain a 5,6,22,23-tetrabromo-24-lower-alkyl-cholestan-3-one, and the resulting tetrabromoketone is dehalogenated using a dehalogenating agent to obtain a 24-lower-alkyl-4,22-cholestadien-3-one.

The first step in carrying out the method of this invention is the cleavage, using a hydrolyzing agent, of the 3-acyloxy group in a starting 3-acyloxy-5,6,22,23-tetrabromosteroid, e. g., a 3-acyloxy-5,6,22,23-tetrabromostigmastane, to obtain a 3-hydroxy-5,6,22,23-tetrabromosteroid, 5,6,22,23-tetrabromostigmastan-3-ol being the product from a 3-acyloxy-5,6,22,23-tetrabromostigmastane. This may be accomplished conveniently by dissolving the steroid acylate in an organic solvent, e. g., benzene, toluene, chloroform, or the like, adding an acid hydrolyzing agent such as a solution of an excess of an acid in an organic solvent, e. g., hydrogen chloride in methanol, ethanol, or the like, mixing and allowing the reaction mixture to stand without external heating or cooling at room temperature, e. g., between about fifteen and about 35 degrees centigrade, for a reaction period of about one day to about one week, with a reaction period of about three to about four days being preferred. Shorter reaction periods may be used if the reaction mixture is heated. The resulting mixture may be washed, if desired, with a basic solution, e. g., aqueous sodium bicarbonate solution, and water. The 3-hydroxy-5,6,22,23-tetrabromosteroid may be isolated, if desired, by evaporating the resulting solution to dryness. The solid residue may be purified, if desired, by conventional procedure, e. g., recrystallization from a suitable solvent, chromatographic adsorption, or the like. The above method of hydrolysis is only illustrative of the methods which may be used and therefore may be varied within wide limits without departing from the scope of this invention. Other methods also may be used, e. g., other hydrolyzing agents such as other halogen acids, e. g., alcoholic hydrobromic acid, or other acid or basic hydrolyzing agents, e. g., sulfuric acid, sodium carbonate, or the like, may be used to convert the 3-acyloxy group to a 3-hydroxy group.

The second step in carrying out the method of the present invention is the oxidation of the 3-hydroxy group in a 3-hydroxy-5,6,22,23-tetrabromosteroid, e. g., 5,6,22,-23-tetrabromostigmastan-3-ol, to a 3-keto group to obtain a 3-keto-5,6,22,23-tetrabromosteroid, the novel 5,6,-22,23-tetrabromostigmastan-3-one being the product from 5,6,22,23-tetrabromostigmastan-3-ol. This may be accomplished conveniently by dissolving the 3-hydroxy-5,6,-22,23-tetrabromosteroid, which need not be purified, in an organic solvent, e. g., benzene, toluene, or the like, and mixing the resulting solution with an excess of an oxidizing agent, e. g., an inorganic oxidizing agent such as, for example, chromium trioxide, potassium dichromate, potassium permanganate, or the like, or an organic oxidizing agent such as, for example, tertiary-butyl chromate, pyridinium chromate, or the like, preferably chromium trioxide. After a suitable reaction period at about room temperature, e. g., about one hour at a temperature between about fifteen and about 35 degrees centigrade, when chromium trioxide is used, the excess chromium trioxide is decomposed with a suitable agent, e. g., alcohol. The resulting solution, if desired, may be washed with a basic solution, e. g., aqueous sodium bicarbonate solution, and water, and then dried over a suitable drying agent, e. g., anhydrous sodium sulfate. The resulting washed and dried solution is usually concentrated to small volume for use in the next step of the method of this invention. However, the 3-keto-5,6,22,23-tetrabromosteroid may be isolated, if desired, by evaporating the solution to dryness. The resulting residue may be purified by conventional procedure, e. g., recrystallization from a suitable solvent, if desired. The above method of oxidation is only illustrative of the methods which may be used and therefore may be varied within wide limits.

The third step in carrying out the method of the present invention is removal, using a dehalogenating agent, of the four bromine atoms of a 3-keto-5,6,22,23-tetrabromosteroid, e. g., 5,6,22,23-tetrabromostigmastan-3-one, to obtain a $\Delta^{4,22}$-3-ketosteroid, 4,22-stigmastadien-3-one being the product obtained from 5,6,22,23-tetrabromostigmastan-3-one. This may be accomplished conveniently by dissolving the 3-keto-5,6,22,23-tetrabromosteroid in an organic solvent, e. g., benzene, toluene, or the like (the washed and dried solution of the tetrabromoketone from the second step above is satisfactory), and mixing with an excess of a metal and an acid, e. g., zinc and acetic acid, and stirring the resulting mixture at room temperature, e. g., between about fifteen and about 35 degrees centigrade for about one to about ten hours. The product may then be isolated by conventional procedure, e. g., filtration to remove the excess metal, washing the filtrate with an acid, e. g., dilute aqueous sulfuric acid, a basic solution, e. g., aqueous sodium carbonate solution, and water; and distillation of the volatile components of the washed solution to obtain the product as the distillation residue. The $\Delta^{4,22}$-3-ketosteroid may be purified, if desired, by conventional procedure, e. g., by recrystallization from a suitable solvent, e. g., ethyl acetate-methanol. The purity of the product and the yield are high. The above illustrative method of dehalogenation may be varied within wide limits and other methods of dehalogenation also may be used.

The starting 3-acyloxy-5,6,22,23-tetrabromosteroids may be obtained in high yield by bromination, using bromine in halogenated solvents such as chloroform, of $\Delta^{5,22}$-3-acyloxysteroids, which, in turn, may be obtained in high yield from $\Delta^{5,22}$-3-hydroxysteroids and the appropriate acylating agent, e. g., formic acid, to produce the 3-formyloxysteroid, acetic anhydride, to produce the 3-acetoxysteroid, etc., the methods employed being the same as prior procedures for the preparation in high yield of 3-acetoxy-5,6,22,23-tetrabromostigmastane.

The following examples are illustrative of the processes and products of the present invention but are not to be construed as limiting.

*Example 1.—4,22-stigmastadien-3-one*

3-acetoxy-5,6,22,23-tetrabromostigmastane (7.74 grams) is dissolved in 225 milliliters of dry benzene and the resulting solution is mixed with 64 milliliters of a 0.4 N solution of hydrogen chloride in anhydrous methanol, the total volume being 290 milliliters. After standing at room temperature for 100 hours, a 205-milliliter portion of the reaction mixture is removed, washed with aqueous sodium bicarbonate solution and water, and concentrated to dryness. The residual 5,6,22,23-tetrabromostigmastan-3-ol weighed 3.7 grams. The 3.7 grams residue is dissolved in 100 milliliters of benzene and treated with 0.7 gram of chromium trioxide at room temperature for one hour. The excess chromium trioxide then is decomposed by adding five milliliters of alcohol and the resulting solution is washed with aqueous sodium bicarbonate solution and with water until water washings are neutral. The neutral solution of 5,6,22,23-tetrabromostigmastan-3-one is dried over anhydrous sodium sulfate and concentrated to a volume of about fifty milliliters. The concentrated solution is treated with five grams of zinc dust and 25 milliliters of glacial acetic acid and stirred for five hours at room temperature. The resulting solution is filtered and washed with 1.0 N sulfuric acid solution, aqueous sodium carbonate solution, and water. Distillation of the solvents gives two grams of product, an overall yield of 68 percent. The product is recrystallized from an ethyl acetate-methanol mixture to give highly purified 4,22-stigmastadien-3-one; melting point 123–127 degrees centigrade; $[\alpha]_D^{24}$ plus 51 degrees in chloroform.

*Example 2.—4,22-stigmastadien-3-one*

In the same manner as shown for the 3-acetoxy compound in Example 1, 3-benzoyloxy-5,6,22,23-tetrabromostigmastane is converted to 5,6,22,23-tetrabromostigmastan-3-ol, which is then converted to 5,6,22,23-tetrabromostigmastan-3-one, the product being isolated in high yield by evaporating the washed and dried solution to dryness. The structure of the product was confirmed by infrared light absorption analysis which showed the presence of a non-conjugated ketone group and the absence of all but a negligible trace of a hydroxyl group. The 5,6,22,23-tetrabromostigmastan-3-one is then redissolved in benzene and treated with zinc and acetic acid to obtain 4,22-stigmastadien-3-one as in Example 1.

*Example 3.—4,22-stigmastadien-3-one*

3-propionyloxy-5,6,22,23-tetrabromostigmastane is converted to 5,6,22,23-tetrabromostigmastan-3-ol in the same manner as shown for the 3-acetoxy compound in Example 1. The product is then converted to 4,22-stigmastadien-3-one following the procedure of Example 1. In the same manner other 3-acyloxy-5,6,22,23-tetrabromostigmastanes are converted to 4,22-stigmastadien-3-one including the formyloxy, butyryloxy, valeryloxy, hexanoyloxy, heptanoyloxy, octanoyloxy, β-cyclopentylpropionyloxy, succinoyloxy, trimethylacetoxy, phenylacetoxy, and other like 3-acyloxy compounds.

*Example 4.—4,22-brassicastadien-3-one*

Following the method of Example 1, 3-acetoxy-5,6,22,-23-tetrabromobrassicastane [Windaus and Welsch, Ber., 42, 612 (1909)] is converted, through the intermediate compounds 5,6,22,23-tetrabromobrassicastan-3-ol and 5,6,22,23-tetrabromobrassicastan-3-one, to 4,22-brassicastadien-3-one. In the same manner other 3-acyloxy-5,6,22,23-tetrabromobrassicastanes are converted to 4,22-brassicastadien-3-one.

Example 5.—*4,22-chalinastadien-3-one*

Using the method of Example 1, 3-acetoxy-5,6,22,23-tetrabromochalinastane is converted, through the intermediate compounds 5,6,22,23-tetrabromochalinastan-3-ol and 5,6,22,23-tetrabromochalinastan-3-one, to 4,22-chalinastadien-3-one. In the same manner other 3-acyloxy-5,6,22,23-tetrabromochalinastanes are converted to 4,22-chalinastadien-3-one.

Example 6.—*4,22-poriferastadien-3-one*

According to the method of Example 1, 3-acetoxy-5,6,22,23-tetrabromoporiferastane is converted, through the intermediate compounds 5,6,22,23-tetrabromoporiferastan-3-ol and 5,6,22,23-tetrabromoporiferastan-3-one, to 4,22-poriferastadien-3-one. In the same manner other 3 - acyloxy-5,6,22,23-tetrabromoporiferastanes are converted to 4,22-poriferastadien-3-one.

In the same manner as shown above in Examples 1 through 6, other 24-lower-alkyl-4,22-cholestadien-3-ones are prepared from the appropriate starting material, including 24-propyl-4,22-cholestadien-3-ones, 24-butyl-4,22-cholestadien-3-ones, 24-pentyl-4,22 - cholestadien-3-ones, 24-hexyl-4,22-cholestadien-3-ones, 24-heptyl-4,22-cholestadien-3-ones, 24-octyl-4,22 - cholestadien - 3 - ones, and other like examples.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A method for the synthesis of a 24-lower-alkyl-4,22-cholestadien-3-one from a 3-acyloxy-5,6,22,23-tetrabromo-24-lower-alkyl-cholestane comprising: hydrolyzing a 3 - acyloxy-5,6,22,23-tetrabromo-24-lower-alkyl-cholestane with an acid hydrolyzing agent to obtain a 5,6,22,23 - tetrabromo-24-lower-alkyl-cholestan-3-ol, oxidizing the 5,6,22,23-tetrabromo-24-lower-alkyl-cholestan-3-ol with an inorganic oxidizing agent to obtain a 5,6,-22,23 - tetrabromo - 24-lower-alkyl-cholestan-3-one, said oxidation being carried out at a temperature below that at which decomposition is appreciable, dehalogenating the 5,6,22,23-tetrabromo-24-lower-alkyl-cholestan-3-one with zinc and an acid, and isolating the 24-lower-alkyl-4,22-cholestadien-3-one produced.

2. A method for the synthesis of 4,22-stigmastadien-3-one from 5,6,22,23-tetrabromostigmastan-3-ol 3-acetate comprising: hydrolyzing 5,6,22,23-tetrabromostigmastan-3-ol 3-acetate with an acid hydrolyzing agent to obtain 5,6,22,23-tetrabromostigmastan-3-ol, oxidizing the 5,6,-22,23-tetrabromostigmastan-3-ol with chromium trioxide to obtain 5,6,22,23-tetrabromostigmastan-3-one, said oxidation being carried out at a temperature below that at which decomposition is appreciable, debrominating the 5,6,22,23-tetrabromostigmastan-3-one with zinc and acetic acid, and isolating 4,22-stigmastadien-3-one.

3. A 5,6,22,23 - tetrabromo-24-lower-alkyl-cholestan-3-one which may be represented by the formula

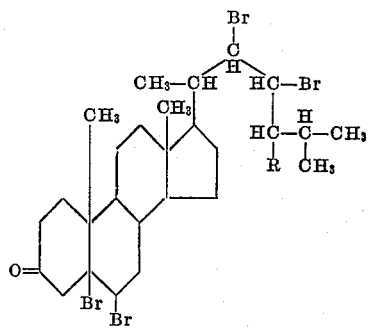

wherein R is a lower-alkyl group.

4. 5,6,22,23-tetrabromostigmastan-3-one which may be represented by the formula

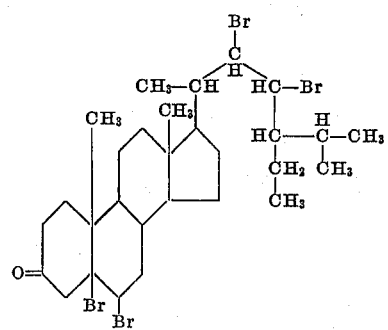

References Cited in the file of this patent
UNITED STATES PATENTS

| 2,203,611 | Bockmuhl | June 4, 1940 |
| 2,340,388 | Inhoffen | Feb. 1, 1944 |